(No Model.)

F. H. MARSHALL.
HOSE COUPLING.

No. 602,863. Patented Apr. 26, 1898.

Witnesses
C. E. Hunt.
Victor J. Evans

Inventor
Frank H. Marshall,
By John Wedderburn.
Attorney

UNITED STATES PATENT OFFICE.

FRANK H. MARSHALL, OF MARIETTA, OHIO.

HOSE-COUPLING.

SPECIFICATION forming part of Letters Patent No. 602,863, dated April 26, 1898.

Application filed June 3, 1897. Serial No. 639,290. (No model.)

*To all whom it may concern:*

Be it known that I, FRANK H. MARSHALL, of Marietta, in the county of Washington and State of Ohio, have invented certain new and useful Improvements in Hose-Couplers; and I do hereby declare the following to be a full, clear, and exact description of the invention, such as will enable others skilled in the art to which it appertains to make and use the same.

My invention relates to hose-couplings; and its object is to provide an improved and simple form of hose-coupling by means of which the different sections of hose may be readily and expeditiously locked together.

A further object is to provide a hose-coupling which will economize in first cost, contain few parts, and be practically indestructible.

To this end the invention consists of certain novel features of construction hereinafter fully described and claimed.

Figure 1:
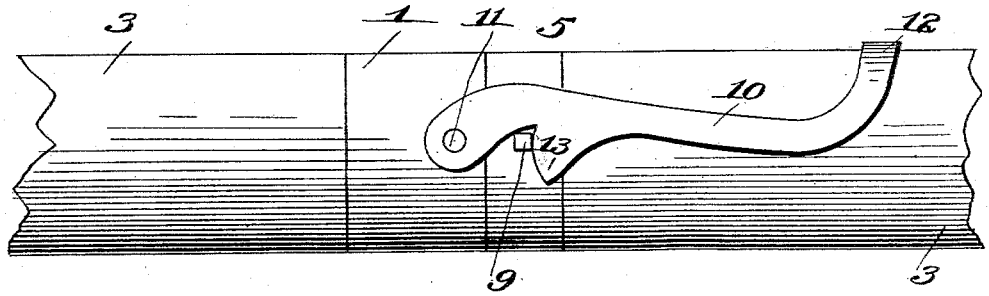
Figure 2:
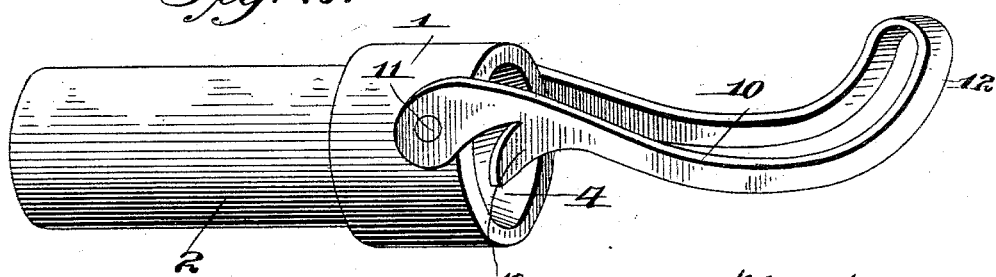
Figure 3:
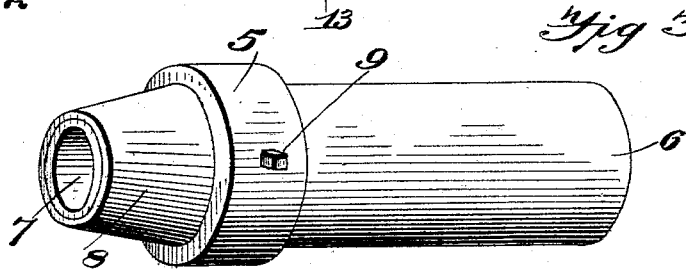
Figure 4:
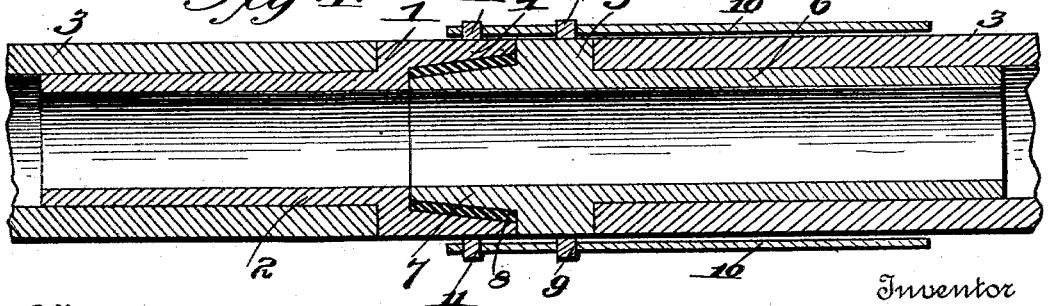

In the accompanying drawings, Figure 1 is a side elevation of two sections of hose locked together with my coupling. Fig. 2 is a perspective view of one member of my coupling; Fig. 3, a similar view of the opposing member, and Fig. 4 is a longitudinal section on the line $x\,x$ of Fig. 1.

The numeral 1 designates the female member of my coupling, which is provided with an elongated tube 2. This tube may be corrugated upon the outside or formed in any of the usual ways to hold the hose proper, which I here designate by the numeral 3. A conical recess 4 is formed in the body of this member of my coupling.

The numeral 5 indicates the male member of my coupling, which is provided with a tube 6, of similar form to the tube 2. The member 5 is further provided with a conical extension 7, having rubber or other packing 8 held thereon. This extension is adapted to enter the recess 4 and form a water-tight joint when forced therein. To one member of the coupling I attach my locking device. Lugs 9 are formed upon the other member to engage the same. The strap 10, forming my locking device, is pivoted at 11, as best shown in Fig. 1. An upwardly-bent portion 12 is of such shape as to engage the exterior surface of the section of hose to which the section bearing the locking device is coupled when said coupling is locked. A curved lug 13 is formed upon the under side of the strap 10. This curved lug is so arranged that when the coupling is locked the lug 9 upon the opposing member thereof will be securely held therein, and it will require a considerable degree of force to unlock said coupling.

To operate my device, it is simply necessary to bring the ends of the hose together and force the strap 10 down upon the opposing hose. The curved lug 13 will readily catch the lug 9 and will force the joints firmly together.

It is obvious that many minor changes may be made in the form of my device without departing from the spirit thereof. I do not, therefore, care to confine myself to the exact form herein shown and described, but rather desire to cover all forms that may properly come within the scope of my invention.

Having thus described my invention, what I claim as new, and desire to secure by Letters Patent, is—

In a hose-coupling, the combination with a female member provided with a tubular extension adapted to be secured inside of a hose, and further provided with a conical recess therein, of a male member provided with a similar extension, a conical projection upon said male member, elastic packing carried upon said conical projection, a strap provided with convexly-curved lugs pivoted to one of said members, and lugs upon the opposing member adapted to engage said strap, substantially as described.

In testimony whereof I have signed this specification in the presence of two subscribing witnesses.

FRANK H. MARSHALL.

Witnesses:
C. W. RICHARDS,
P. W. NEECE.